UNITED STATES PATENT OFFICE.

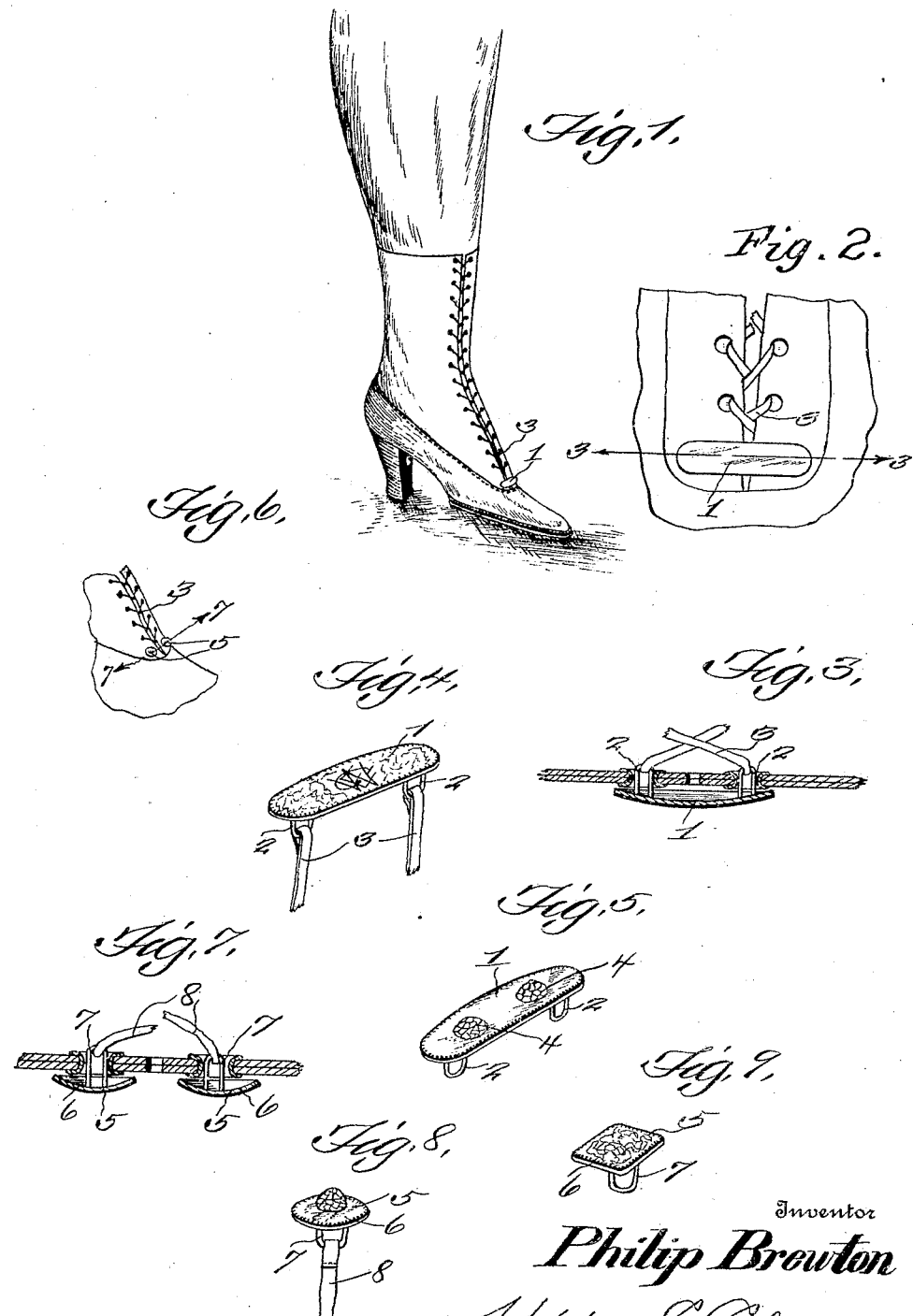

PHILIP BREWTON, OF MOBILE, ALABAMA.

SHOESTRING ATTACHMENT OR FASTENING DEVICE.

1,368,690.  Specification of Letters Patent.  Patented Feb. 15, 1921.

Application filed October 4, 1919. Serial No. 328,388.

*To all whom it may concern:*

Be it known that I, PHILIP BREWTON, a citizen of the United States, residing at Mobile, in the county of Mobile and State of Alabama, have invented certain new and useful Improvements in Shoestring Attachments or Fastening Devices, of which the following is a specification, reference being had to the accompanying drawings.

This invention relates to an improved shoe string attachment and fastening device, particularly adapted for use in connection with ladies' shoes, though not necessarily, for it is obvious that they can be used in connection with men's shoes, if so desired.

As a primary object of the invention, it is the aim to provide a fastener or attaching device, particularly adapted for use at the base of the opening between the opposite sides of the upper of the shoe, so as to bridge the base of the opening, and to which the shoe strings are detachably connected, so as to hold the strings even at all times.

Another object of the invention is the provision of a fastener, which is adapted to bridge the base of the opening, so as to hold the opposite sides of the upper properly spaced at the point where the opposite sides attach to the vamp of the shoe. For instance, the loops which are carried by the fastener and to which the strings are attached, engage through the eyelets of the opposite sides of the upper, thereby holding the opposite sides in position, as well as holding the fastener securely in place, and also to hold the fastener tightly against the upper adjacent the vamp.

A further object of the invention is the provision of a fastener or attaching device, which not only acts as such, but also constitutes an ornament for the shoe. In such a case, the fastener may be constructed of any suitable metal, such as silver, gold or the like, or may be constructed of a cheaper metal, silver or gold plated. In this case, the fastener may be engraved or otherwise decorated, or set with precious stones, such as diamonds, emeralds or the like, or imitations thereof.

When made out of gold or silver or any other suitable metal, and if not set with precious stones, the surface of the fastener or attaching device may be engraved with a suitable monogram or any other engraving of an ornamental character. Furthermore, the fastener or attaching device may be made of pearl or other material, such as ebony of the like. Also a pair of fasteners may be employed, one for each string, instead of a single fastener.

While the design and construction at present set forth and illustrated is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a perspective view of a lady's shoe, showing the shoe fastener or attaching device applied to the shoe, and the shoe properly laced.

Fig. 2 is an enlarged view in elevation of a portion of the upper of the shoe showing the fastener or attaching device at the base of the opening between the sides of the upper.

Fig. 3 is a sectional view on line 3—3 of Fig. 2.

Fig. 4 is an enlarged detail perspective view of the fastener or attaching device.

Fig. 5 is a view similar to Fig. 4, showing the fastener set with precious stones, say for instance such as diamonds or the like.

Fig. 6 is a detail view of a shoe, showing a pair of fasteners applied.

Fig. 7 is a sectional view on line 7—7 of Fig. 6.

Fig. 8 is a detail perspective view of one of the fasteners shown in Fig. 6.

Fig. 9 is a detail perspective view of a fastener to be used on a single string in the same manner as shown in Fig. 6, but illustrating a different design of fastener.

Referring more especially to the drawings, 1 designates a fastener, which is constructed from a piece of suitable sheet metal, of elongated form, and which may be any suitable shape, length, width and may be provided on its outer face with any suitable ornamental design. If desired, the fastener may be set with stones, such as diamonds, sapphires or the like, in order to afford an attractive appearance. Preferably, though not necessarily, the plate is convexed, and on its under surface it is provided with loops 2 adjacent the opposite ends of the plate. These loops may be formed of any suitable material, such as wire or the like, and are fastened to the plate in any suitable manner, as for instance by soldering, or otherwise connected to the plate. The loops 2 are designed to pass through the eyelets of the opposite sides of the upper, whereby the fastener or attaching device may bridge the opening between the opposite sides of the upper, adjacent where the upper fastens to the vamp of the shoe. By means of positioning the plate in this manner as shown, the opposite sides of the upper are held in position. Furthermore, by inserting the loops 2 through the eyelets of the opposite sides of the upper, the fastener or attaching device is held close to the upper of the shoe. Shoe strings 3 of any suitable material are attached to the loops 2, as by means of stitches as indicated. These strings are designed to be threaded through the eyelets of the upper of the shoe, so as to hold the opposite sides of the upper in place. By means of the fastener or attaching device, the shoe strings are held adjusted in place, so that one will not work longer than the other. In other words, the ends of the shoe strings will remain even at all times.

In Fig. 5, the fastener or attaching plate is set with precious stones as diamonds or the like, as indicated at 4.

In Fig. 4, the fastener or attaching device may be plain on its outer surface, or as shown in Fig. 4 it may be provided with any suitable engraving, such as that indicated.

Referring to Figs. 6, 7, 8 and 9, each shoe string has a single fastener 5, which comprises a plate 6, provided on its under surface with a wire loop 7, to which the shoe string 8 is connected. The plate, as shown in Figs. 6, 7, 8 and 9 may be any suitable configuration or proportion, and if desired, may be set with a precious stone or provided with a monogram or any suitable ornamental engraving, as indicated. The single fastener is disposed over the eyelet and the wire loop thereof passes through the eyelet, thereby permitting the plate to fit snugly against the outer surface of the upper of the shoe.

In addition to the plate 1 acting as a fastening or anchoring means for the shoe string and to permit the shoe strings to lace out evenly at their extremities, the plate also acts as a reinforcement or strengthening device, to relieve the strain upon the retaining stitches between the extreme lower portion of the opposite sides of the upper adjacent where the upper joins the vamp of the shoe. By relieving the strain on the stitchings, the stitchings will not break, before the shoe is entirely worn out.

The invention having been set forth, what is claimed as new and useful is:

1. In an article of manufacture, a plate adapted to arch or fit over the adjacent edge portions of the upper of a shoe, the under face of the plate adjacent its opposite ends having wire loops adapted to extend through the eyelets of the opposite sides of the upper of the shoe, to hold the opposite sides of the upper in close position to each other, and to provide attaching means for shoe strings.

2. In an anchoring device for holding shoe strings even, the combination with an elongated plate adapted to bridge the lower end of the opening between the opposite sides of the upper of a shoe, of wire loops fixedly connected to the under face of the plate adjacent its opposite ends and passing through the eyelets of the opposite sides of the upper, to hold the plate in a bridged position and to retain the opposite sides of the upper spaced in position, and shoe strings of even length, one attached to each wire loop to additionally secure the plate in position, whereby the ends of the strings will be even after the shoe is completely laced, said plate with the loops engaging the eyelets acting to relieve the strain upon the retaining stitchings between the lower portions of the sides of the upper.

In testimony whereof I hereunto affix my signature.

PHILIP BREWTON.